(12) United States Patent
Mottaez et al.

(10) Patent No.: US 8,589,846 B2
(45) Date of Patent: Nov. 19, 2013

(54) MODELING TRANSITION EFFECTS FOR CIRCUIT OPTIMIZATION

(71) Applicant: Synopsys, Inc., Mountain View, CA (US)

(72) Inventors: Amir H. Mottaez, Los Altos, CA (US); Mahesh A. Iyer, Fremont, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 13/629,400

(22) Filed: Sep. 27, 2012

(65) Prior Publication Data
US 2013/0145338 A1 Jun. 6, 2013

Related U.S. Application Data

(60) Provisional application No. 61/566,464, filed on Dec. 2, 2011.

(51) Int. Cl.
*G06F 9/455* (2006.01)
*G06F 17/50* (2006.01)

(52) U.S. Cl.
USPC .............. 716/113; 716/108; 716/134

(58) Field of Classification Search
USPC .......................... 716/108, 113, 134
See application file for complete search history.

(56) References Cited

U.S. PATENT DOCUMENTS

| 5,655,109 | A | * | 8/1997 | Hamid | 716/103 |
| 6,584,598 | B2 | * | 6/2003 | Rao et al. | 716/108 |
| 2002/0101262 | A1 | * | 8/2002 | Taki | 326/83 |
| 2003/0121013 | A1 | * | 6/2003 | Moon et al. | 716/6 |
| 2007/0136706 | A1 | * | 6/2007 | Hwang et al. | 716/6 |

* cited by examiner

*Primary Examiner* — Vuthe Siek
*Assistant Examiner* — Brian Ngo
(74) *Attorney, Agent, or Firm* — Park, Vaughan, Fleming & Dowler, LLP; Laxman Sahasrabuddhe

(57) ABSTRACT

Systems and techniques are described for determining a transition-effect model for a timing arc of a library cell. A transition-effect model can be determined for each library cell that is used during an optimization process. The transition-effect models enable an optimization system to estimate the impact of a change in the transition at an output of a driver gate on the delays of downstream gates without requiring to propagate the change in the transition to the downstream gates. Once determined, the transition-effect models can be used to compute one or more transition-induced penalties during circuit optimization. An optimization system can then use the one or more transition-induced penalties to determine whether or not to accept an optimizing transformation, or to discretize a solution obtained from a numerical solver.

18 Claims, 5 Drawing Sheets

|  | IT1 | IT2 | IT3 | ITm |
|---|---|---|---|---|
| OL1 | (OD11,OT11) | (OD12,OT12) | (OD13,OT13) | (OD1m,OT1m) |
| OL2 | (OD21,OT21) | (OD22,OT22) | (OD23,OT23) | (OD2m,OT2m) |
| OL3 | (OD31,OT31) | (OD32,OT32) | (OD33,OT33) | (OD3m,OT3m) |
| ⋮ | | | | |
| OLn | (ODn1,OTn1) | (ODn2,OTn2) | (ODn3,OTn3) | (ODnm,OTnm) |

NLDM 104

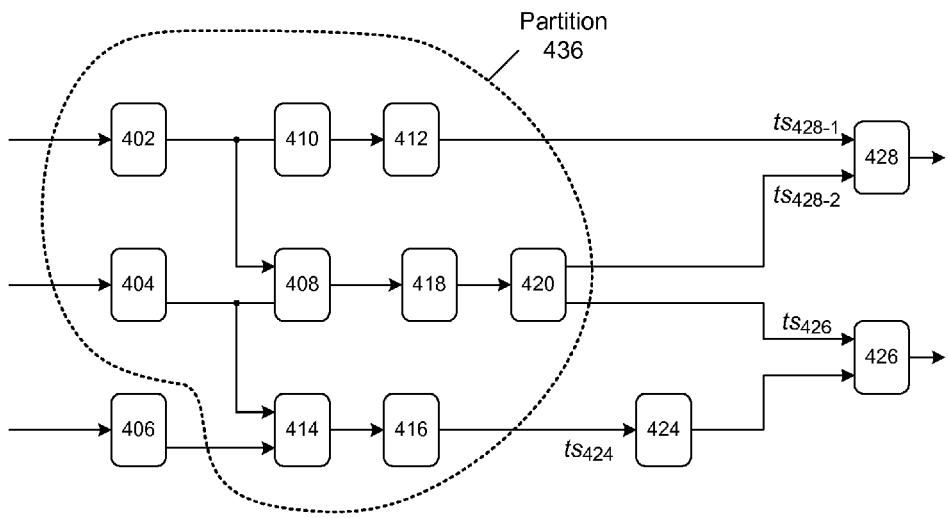

FIG. 4

```
Receive a discretized delay model for a timing arc of the
library cell, wherein the discretized delay model is capable of
being represented by a set of points in a multi-dimensional
space, the multi-dimensional space including an output
loading dimension, an input transition dimension, an output
delay dimension, and an output transition dimension
502
```

```
Determine a set of transition-effect coefficients for the timing
arc of the library cell based on the discretized delay model,
wherein each transition-effect coefficient represents a linear
relationship between a change in output delay and a change
in input transition for a corresponding output load value from
a set of output load values
504
```

```
Use the set of transition-effect coefficients during circuit
optimization
506
```

FIG. 5

MODELING TRANSITION EFFECTS FOR CIRCUIT OPTIMIZATION

RELATED APPLICATION

This application claims priority to U.S. Provisional Application Ser. No. 61/566,464, by Mahesh A. Iyer and Amir H. Mottaez, filed on 2 Dec. 2011, the contents of which are herein incorporated by reference.

BACKGROUND

1. Technical Field

This disclosure relates to electronic design automation (EDA). More specifically, this disclosure relates to modeling transition effects for circuit optimization.

2. Related Art

The goal of circuit synthesis is to convert a high-level description of a circuit design into an implementation that meets a set of timing constraints, and at the same time optionally optimizes one or more metrics, such as area, leakage power, etc.

Some circuit synthesis approaches create an initial circuit design at a given abstraction level (e.g., a logical or physical design). Next, a cell is identified in the circuit design for optimization based on the metrics that are desired to be optimized. An optimal size for the identified cell is then determined by iteratively replacing the identified cell with functionally equivalent cells that have different sizes (this optimization process is also referred to as "sizing the cell," "sizing the gate," etc.). For each replacement cell size that is tried, the circuit synthesis approach updates timing information (often throughout the entire circuit design), and rejects cell sizes for which one or more timing constraints are violated. The iterative optimization process typically terminates after the optimization process has executed for a certain number of iterations or for a certain amount of time.

Iterative trial-and-error based circuit optimization processes often take too long to complete and/or produce poor quality results especially for large circuit designs in which timing constraints are checked across many process corners and modes.

SUMMARY

Some embodiments described herein provide techniques and systems for determining a transition-effect delay model for a timing arc of a library cell. One or more transition-effect models (e.g., one transition-effect model per discretized delay model) can be determined for each library cell that is used during an optimization process. The transition-effect models enable an optimization system to estimate the impact of a change in the transition at an output of a driver gate (e.g., the transition at the output of the driver gate may change due to an optimizing transformation that involved the driver gate) on the delays of downstream gates without requiring to propagate the change in the transition to downstream gates in the circuit design.

The delay behavior of a timing arc of a library cell can be described using one or more discretized delay models. A discretized delay model is a model that is capable of being represented by a set of points in a multi-dimensional space, where the multi-dimensional space includes an output loading dimension, an input transition dimension, an output delay dimension, and an output transition dimension. For example, a discretized delay model can be represented as a non-linear delay model (NLDM) table.

In some embodiments, a set of transition-effect coefficients for a timing arc of a library cell is determined based on a discretized delay model for the timing arc. Each transition-effect coefficient represents a linear relationship between a change in output delay and a change in input transition for a corresponding output load value. For example, a transition-effect coefficient can correspond to a slope in a plot of output delay versus input transition, or to a slope in a plot of input transition versus output delay. When the transition-effect coefficient is the slope in a plot of output delay versus input transition, it describes the delta-change in output delay for a delta-change in input transition for a given load. In some embodiments, the transition-effect coefficient can be computed at either a nominal input transition value or a nominal output delay value. In some embodiments, the transition-effect coefficient can be computed for each of the input transition output load value pairs and stored as another dimension in the NLDM table.

Once the transition-effect model (e.g., the transition-effect coefficients) is computed, it can be used to compute one or more transition-induced penalties during circuit optimization. A transition-induced penalty is a delay penalty that estimates the impact that a change in a transition has on the delays of downstream gates. The optimization system can then use the one or more transition-induced penalties (e.g., by adding the transition-induced penalties to corresponding delay values) to determine whether or not to accept an optimizing transformation, or to discretize a solution obtained from a numerical solver.

BRIEF DESCRIPTION OF THE FIGURES

FIG. 4 illustrates how the transition-induced penalty can be used in a peep-hole or partition based optimization system in accordance with some embodiments described herein.

FIG. 5 illustrates a process for determining a transition-effect model for a timing arc of a library cell in accordance with some embodiments described herein.

DETAILED DESCRIPTION

Figures 1A, 1B:
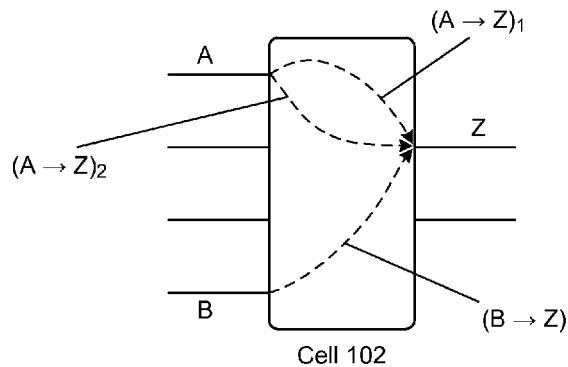
FIG. 1A illustrates a library cell in accordance with some embodiments described herein.
FIG. 1B illustrates how an NLDM can be viewed as a two dimensional table in accordance with some embodiments described herein.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z.

Overview of an Electronic Design Automation (EDA) Flow

An EDA flow can be used to create a circuit design. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are for illustrative purposes only and are not intended to limit the embodiments to the forms disclosed.

Some EDA software tools enable circuit designers to describe the functionality of the circuit design. These tools also enable circuit designers to perform what-if planning to refine functionality, check costs, etc. During logic design and functional verification, the HDL (hardware description language), e.g., SystemVerilog, code for modules in the system can be written and the design can be checked for functional accuracy, e.g., the design can be checked to ensure that it produces the correct outputs.

During synthesis and design for test, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout (placement) and can be electrically coupled (routing).

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks which are used during fabrication.

Process for Modeling Transition Effects

FIG. 1A illustrates a library cell in accordance with some embodiments described herein.

Library cell 102 has a set of inputs and a set of outputs. A signal path within library cell 102 from an input to an output is called a timing arc. One or more timing arcs may exist between an input and an output of a library cell. For example, two timing arcs exist between input A and output Z, which are shown as $(A \rightarrow Z)_1$ and $(A \rightarrow Z)_2$ in the figure. Only one timing arc exists between input B and output Z which is shown as $(B \rightarrow Z)$ in the figure. The delay behavior for each timing arc can be different. Furthermore, for a given timing arc, the delay behavior for a rising output transition can be different from the delay behavior for a falling output transition. In complex library cells like multiplexors, the difference in the delay characteristics for different timing arcs and for rising/falling output transitions can be significant.

The term "non-linear delay model," or "NLDM" for short, is used in this disclosure to refer to a discretized delay model that models cell delay. A discretized delay model is a model in which the delay behavior is represented using a set of discrete data points of delay behavior. Specifically, a discretized delay model, e.g., an NLDM, can be viewed as a set of points in a multi-dimensional space that includes an output loading dimension, an input transition (i.e., slew) dimension, an output delay dimension, and an output transition dimension.

In some embodiments, separate discretized delay models exist for one or more of: rise-rise, rise-fall, fall-rise, and fall-fall transitions. The term "rise-rise transition" refers to the situation when the input is a rising transition and the output is also a rising transition. The other terms have similar definitions. In some implementations, two or more NLDMs exist for each timing arc of each library cell, wherein each NLDM models the delay for a rise-rise, a rise-fall, a fall-rise, or a fall-fall transition.

FIG. 1B illustrates how an NLDM can be viewed as a two dimensional table in accordance with some embodiments described herein.

NLDM 104 can be represented as a two dimensional table, wherein each element in the table is a tuple of two values. Each row in the table corresponds to a particular output loading value: OL1, OL2, . . . , OLn. Each column in the table corresponds to a particular input transition value: IT1, IT2, . . . , ITm. Each element in the table is a tuple of the output delay value and the output transition value. For example, the tuple (OD32, OT32) is a tuple of the output delay value OD32 and the output transition value OT32 that corresponds to the output loading value OL3 and input transition value IT2. The two dimensional table shown in FIG. 1B can be used to look up the output delay and output transition value for a given output loading and input transition value.

Figure 1C:
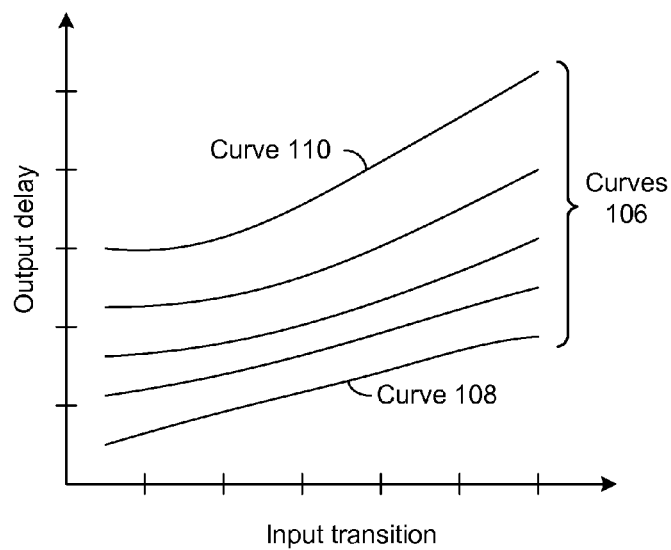
FIG. 1C illustrates curves for output delay versus input transition for different output loads in accordance with some embodiments described herein.

FIG. 1C illustrates curves for output delay versus input transition for different output loads in accordance with some embodiments described herein.

As explained above, an NLDM can be viewed as two dimensional table. For a given output load value, the variation of output delay versus input transition can be plotted based the two dimensional table. Each of the curves 106 shown in FIG. 1C corresponds to such a plot for a given output load. The curves at the top correspond to higher output loads. For example, the output load corresponding to curve 110 is higher than the output load corresponding to curve 108. For each of the input transition (IT) and output load (OL) values in the NLDM table we can compute a transition-effect coefficient by computing the delta change in output delay for a delta change ($\epsilon$) in the input transition. The transition-effect coefficient can then be stored in the NLDM table (e.g., as the fifth dimension).

Figure 2:
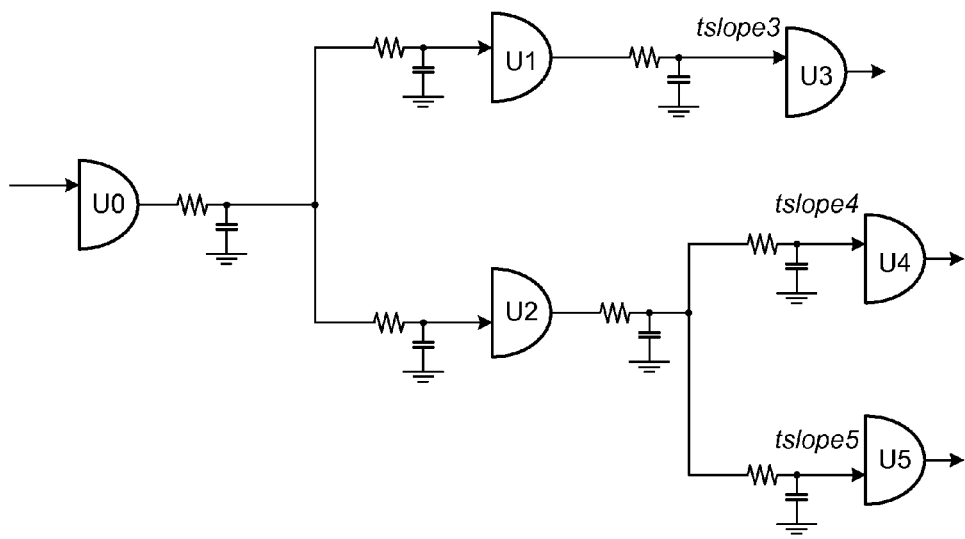
FIG. 2 illustrates how transition-effect models can be used in accordance with some embodiments described herein.

FIG. 2 illustrates how transition-effect models can be used in accordance with some embodiments described herein.

In the portion of the circuit design shown in FIG. 2, gates U1 and U2 are simultaneously sized given a set of loads—U3, U4, and U5—that are not sized together with U1 and U2 (i.e., gates U3, U4, and U5 are sized separately). In some embodiments described herein, the effect of the change in the output transition of U1 and U2 (which occurs as the different sizes of these cells are considered) on the delay of downstream gates U3, U4, and U5 can be computed locally without resorting to the propagation of changed transitions to U3, U4, and U5, and the evaluation of the gate delays of U3, U4, and U5 based on the newly propagated transitions. In FIG. 2, the wires that electrically connect the inputs and outputs of the gates are modeled using a network of resistances and capacitances. Gate U0 is the driver gate that drives the input pins of gates U1 and U2 which are being sized. The term "downstream gates" refers to gates that are in the fan-out cone, i.e., a second gate is downstream with respect to a first gate if the second gate is in the fan-out cone of the first gate. For example, gates U1-U5 are downstream gates with respect to gate U0.

A transition-effect coefficient represents a linear relationship between a change in the input transition and a change in the output delay. One example of a transition-effect coefficient is a transition-induced delay slope ($t_{slope}$), which can be computed for every input of a gate given its current load. In some embodiments, the transition-induced delay slope represents the slope of a given curve shown in FIG. 1C around a nominal input transition value or a nominal output delay value. In some embodiments, the $t_{slope}$ values are pre-computed for each of the discrete input transition and output load values of the NLDM table, and stored in the NLDM table. In other embodiments, the $t_{slope}$ value is computed on-the-fly for the current input transition and output load. For example, $t_{slope}$ can be computed using the following expression:

$$t_{slope} = \frac{\text{Delay}(IT + \varepsilon, OL) - \text{Delay}(IT - \varepsilon, OL)}{2 \cdot \varepsilon} \quad (1)$$

Equation (1) was presented for illustration purposes only. It will be apparent to those of ordinary skill in the art that many other analytical expressions can be used to compute the slope. For example, instead of using Equation (1), the slope can be computed as follows:

$$t_{slope} = \frac{\text{Delay}(IT + \varepsilon, OL) - \text{Delay}(IT, OL)}{\varepsilon}. \quad (2)$$

In the above two equations, "IT" is the input transition value and "OL" is the output load value. The "Delay" function returns (e.g., by performing a NLDM table lookup) the output delay value that corresponds to the input transition and output load values that were provided as arguments to the function, and $\varepsilon$ is a small perturbation value (i.e., small compared to the value of IT) that is used for computing the slope.

The gates in the circuit design can generally be processed in any given order. Some embodiments can optimize gates in a reverse-levelized order. In a reverse-levelized order, each logic gate is associated with a level so that each logic gate's level is greater than the highest level associated with logic gates that are electrically coupled to the logic gate's fan-out. Note that gates that are "near" the outputs generally have a lower level than the gates that are "near" the primary inputs of the circuit design. Optimizing gates in reverse-levelized order means that the gates are optimized in increasing order of their levels, i.e., a gate at level n will only be optimized after all gates at level n−1 have been optimized. In an optimization system that optimizes the circuit in a reverse-levelized manner from timing end-points to timing start-points, the $t_{slope}$ values of a gate's inputs can be kept up-to-date as the size of the gate changes.

In an optimization system that optimizes the circuit in arbitrary order, the $t_{slope}$ values of a gate's inputs can be kept up-to-date when the size of the gate changes, or when the load on one of the gate's outputs changes. In embodiments where the $t_{slope}$ value is stored in the NLDM table for each (IT, OL) tuple, the $t_{slope}$ value can be quickly looked-up when the load on one of the gate's outputs changes.

The $t_{slope}$ value of each gate input is propagated and combined at the driver of the gate input so that the propagated $t_{slope}$ value can be used when the driver is optimized. For example, in FIG. 2, once gates U1 and U2 are sized, the optimization system may then size driver gate U0. At this point, the $t_{slope}$ values of the inputs of gates U1 and U2 can be propagated to driver gate U0, and the propagated $t_{slope}$ value can be used by the optimization system while sizing driver gate U0.

The $t_{slope}$ values can be propagated using a number of techniques. In general, the intent is to propagate the $t_{slope}$ value in a way that ensures that sizing the driver gate by taking the propagated $t_{slope}$ value into consideration will result in a driver gate size that is unlikely to cause timing violations in downstream gates in the fan-out cone of the driver gate. In other words, the intent is to propagate back the "worst-case" transition-effect coefficient. One equation for propagating the $t_{slope}$ value is shown below:

$$t_{slope}^{driver} = \max_{i \in driver's\ loads} \{t_{slope}^i\}, \quad (3)$$

where, $t_{slope}^{driver}$ is the propagated $t_{slope}$ value, and $t_{slope}^i$ is the $t_{slope}$ value for the $i^{th}$ load that is being driven by the driver gate. Equation (3) was presented for illustration purposes only. Many variations and modifications will be apparent to those of ordinary skill in the art.

In some embodiments, the $t_{slope}$ value that corresponds to the driver load (e.g., in FIG. 2, gate U1 is a driver load of driver gate U0) with the minimum slack margin or the worst slack can be propagated to the driver gate. The slack margin (or "margin" for short) at an pin of a gate can be determined by computing a difference between the slack value at the pin of the gate and a corresponding slack value at a timing endpoint whose required time was propagated back to the pin of the gate for computing the slack value at that pin. The margin value at a pin represents the extent to which a local change on the pin affects the global timing of the corresponding endpoints of the design. Examples of systems and techniques for computing and using margin values are described in U.S. patent application Ser. No. 12/783,915, entitled "Global timing modeling within a local context," filed on 20 May 2010, the contents of which are herein incorporated by reference. The following equation propagates the $t_{slope}$ value that corresponds to the driver load with the minimum slack margin to the driver gate:

$$t_{slope}^{driver} = t_{slope}^k, \quad (4)$$

where $$k = \underset{i \in driver's\ loads}{\arg\min}\ M_i.$$

In the above equation, $t_{slope}^k$ is the $t_{slope}$ value for the $k^{th}$ load, $M_i$ is the margin of the $i^{th}$ load, and the function argmin returns the value of argument i that corresponds to the minimum margin value $M_i$.

Once a $t_{slope}$ value has been propagated to the driver gate, the propagated $t_{slope}$ value can be used during optimization. Specifically, during optimization of a gate (e.g., sizing the gate) the effect of the change in the output transition of the gate (that is caused by optimizing the gate), and the ensuing change in the delay of the downstream gates caused by this change, can be modeled as a transition-induced penalty in the delay of the gate being optimized.

The transition-induced penalty ($d_{tp}$) can be computed as follows:

$$d_{tp} = (s_{new}^{driver} - s_{orig}^{driver}) \cdot t_{slope}^{driver}, \quad (5)$$

where, $s_{new}^{driver}$ and $s_{orig}^{driver}$ are the new and original output transitions, respectively, at the output of the driver gate. The original output transition corresponds to the transition before making any transformations (such as changing the library cell) at the driver gate, and the new output transition corresponds to the transition after making a transformation at the driver gate. In the case of a sizing transformation, the original output transition corresponds to the transition corresponding to the original library cell (i.e., the library cell that was instantiated at the beginning of the optimization process or the library cell that was instantiated in the previous iteration of the optimization process) at the driver gate, and the new output transition corresponds to the transition corresponding to the library cell that is being considered as a replacement to the driver gate. Recall that each library cell corresponds to one or more NLDM tables. When a candidate library cell is considered as a replacement, the input transition remains the same, but a new output transition value $s_{new}^{driver}$ is determined based on the NLDM table corresponding to the candidate library cell.

Figure 3:
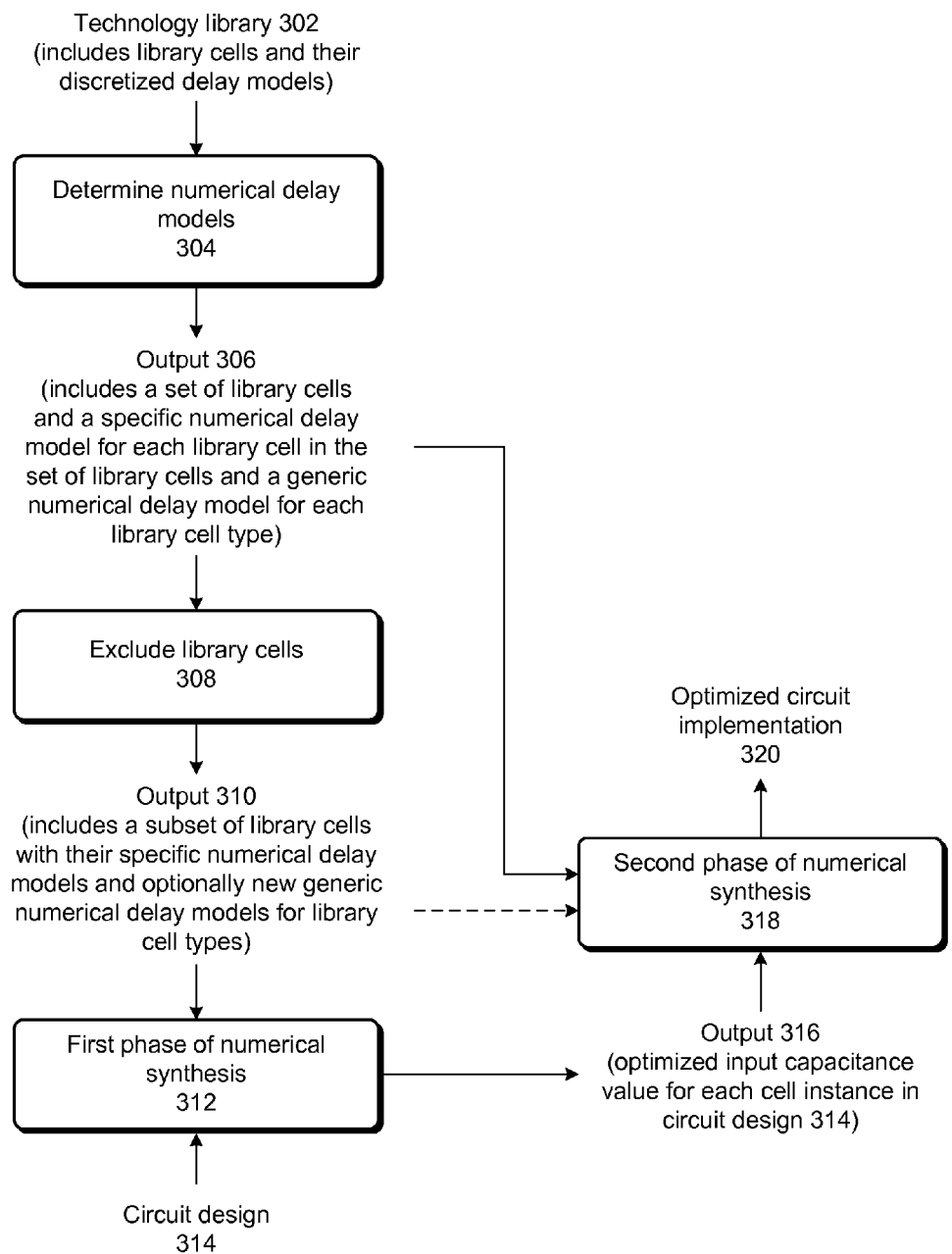
FIG. 3 illustrates a numerical synthesis process in accordance with some embodiments described herein.

The transition-induced penalty can be used in many applications. Some of these applications will now be discussed. One application of the transition-induced penalty is in numerical synthesis. FIG. 3 illustrates a numerical synthesis process in accordance with some embodiments described herein.

Technology library 302 includes library cells and discretized delay models for the library cells. The library cells in technology library 302 can be used to create and/or optimize a circuit design. The term "library cell" refers to a cell in a technology library. The term "library cell" is to be distinguished from the term "cell instance" which is an instantiation of a library cell in a circuit design. In some embodiments, a discretized delay model models the delay for a timing arc of a library cell.

The term "library cell type" refers to a particular logical functionality. Examples of functionalities include, but are not limited to, "AND," "OR," "XOR," "multiplexor," etc. The term "library cell" refers to a particular implementation of a library cell type. A technology library can be viewed as a collection of library cells of one or more library cell types. For example, a technology library may include multiple sizes of an inverter. In this example, the term "inverter" is the library cell type, and the term "library cell" refers to an inverter implementation of a particular size.

A numerical delay model is a delay model that can be used by a numerical solver to optimize a cost function. A linear delay model is one example of a numerical delay model. More generally, an analytical formula that represents the delay behavior, and that is capable of being used to construct an optimization problem for a numerical solver, is an example of a numerical delay model.

The term "specific numerical delay model" refers to a numerical delay model that models the delay behavior of a particular timing arc of a particular library cell, or the delay behavior of a particular library cell (i.e., regardless of the timing arc). A specific numerical delay model is defined using a specific logical effort value and a specific parasitic delay value.

The term "generic numerical delay model" refers to a numerical delay model that models an aggregated delay behavior of either a timing arc of a library cell type or the library cell type (i.e., regardless of the timing arc). A generic numerical delay model is defined using a generic logical effort value and a generic parasitic delay value.

Examples of systems and techniques that can be used to determine specific and generic numerical delay models are described in U.S. patent application Ser. No. 13/450,178, entitled "Numerical delay model for a technology library cell and/or a technology library cell type," the contents of which are herein incorporated by reference in their entirety.

Some embodiments determine numerical delay models based on technology library 302 (operation 304). Output 306 of operation 304 can include a set of library cells and a specific numerical delay model for each library cell in the set of library cells and a generic numerical delay model for each library cell type. The set of library cells in output 306 typically includes all library cells in technology library 302, but in some embodiments certain library cells may be removed if desired.

Certain library cells can then be excluded (operation 308) to obtain a subset of library cells. Each library cell in the subset of library cells has a specific numerical delay model that was computed in operation 304. In some embodiments, a new generic numerical delay model can be determined for each cell type based on the specific numerical delay models corresponding to the subset of library cells. These generic numerical delay models are "new" because they are based on the subset of library cells as opposed to being based on the set of library cells that were used in operation 304 to determine the generic numerical delay models. Output 310, i.e., the subset of library cells with their specific numerical delay models and optionally the new generic numerical delay models for the library cell types, can then be provided as input to the first phase of numerical synthesis 312.

Examples of systems and techniques that can be used to exclude library cells are described in U.S. patent application Ser. No. 13/479,807, entitled "Excluding library cells for delay optimization in numerical synthesis," the contents of which are herein incorporated by reference in their entirety.

The first phase of numerical synthesis 312 sizes cells in circuit design 314 using the subset of library cells with their specific numerical delay models and the new generic numerical delay models. In some embodiments, the first phase of numerical synthesis 312 models a numerical optimization problem based on circuit design 314 and the specific and generic numerical models for the subset of library cells. Examples of systems and techniques that can be used to perform the first phase of numerical synthesis 312 are described in U.S. patent application Ser. No. 13/563,316, entitled "Optimizing a circuit design for delay using load-and-slew independent numerical delay models," the contents of which are herein incorporated by reference in their entirety.

Output 316 from the first phase of numerical synthesis 312 includes the numerically optimized size for each cell instance in circuit design 314. Specifically, in some embodiments, output 316 includes the numerically optimized (and desired) input capacitance value for each cell instance in the circuit design 314.

Output 316 is then provided as one of the inputs to the second phase of numerical synthesis 318. The other input to second phase of numerical synthesis 318 is output 306 which includes the set of library cells that were generated by operation 304. The second phase of the numerical synthesis 318 then instantiates cells that have the numerically optimized and desired cell sizes in circuit design 314 to produce optimized circuit implementation 320 using the discrete library cells from the technology library. In particular, for each cell instance in circuit design 314, the second phase of numerical synthesis 318 selects a library cell that best matches the numerically optimized size, (if a library cell with exactly the optimized size is not available, a library cell with nearly the optimized size is selected) from the set of library cells that were part of output 306. In some embodiments, second phase of numerical synthesis 318 also receives output 310 as input (shown in FIG. 3 using a dashed line). Specifically, second phase of numerical synthesis 318 can use the fact that certain cells were excluded from output 306 to determine which cells to instantiate.

The reason a subset of library cells is used in the first phase and the set of library cells is used in the second phase is as follows. The first phase determines numerically optimized cell sizes by solving a numerical optimization problem. In this phase, it is desirable to restrict the search space to library cells that can be accurately modeled using a logical effort and parasitic delay based numerical modeling approach. Therefore, a subset of library cells is used in this phase to restrict the search space. Once the numerically optimized cell sizes have been determined, it is important to enable the circuit synthesis process to select cell instances from a wide range of library cells. Therefore, in the second phase, the restriction on the search space is relaxed and the set of library cells from output 306 is used.

Some embodiments described herein feature a numerical synthesis system that uses the transition-induced penalty. The transition-induced penalty can be used in the first phase, the second phase, or both the first and the second phase of a numerical synthesis system. In the first phase of numerical synthesis 312, the transition-induced penalty can be used to determine optimal cell sizes. In the second phase of numerical synthesis 318, the transition-induced penalty can be used during discretization. Discretization refers to the operation of identifying a library cell that best matches the optimized cell size (e.g., optimal input capacitance) that was outputted by the numerical solver in the first phase of numerical synthesis 312. In the embodiments that use the transition-induced penalty, the discretization operation adjusts the output delay of the gate being optimized by adding the transition-induced penalty, and uses the adjusted delay value to determine which library cell to instantiate.

Some embodiments described herein feature a numerical synthesis approach (such as the one illustrated in FIG. 3) that is adapted to optimize area (instead of delay), and that uses the transition-induced penalty. In such area optimization systems, the discretization operation can use transition-induced penalty to identify a cell library that minimizes area and that is unlikely to cause input transition violations in gates that are in a fan-out cone of an output of the gate being optimized.

Another application of the transition-induced penalty is in the so-called peep-hole or partition based optimization systems. Evaluating each optimization transformation in the full design context would result in a large run-time penalty. To overcome this problem, peep-hole based optimization systems construct/carve-out a small sub-circuit from the larger design. Next, various optimization transformations (e.g., buffer, sizing, phase, composition, etc.) are performed in the small sub-circuit in order to efficiently determine the best transformation that can be evaluated in the larger design context. This sub-circuit is referred to as a peep-hole or partition. One of the problems faced by conventional peep-hole or partition based approaches is that even if the transformation improves the delay of the sub-circuit, a degradation in the transition at the output of the sub-circuit can cause a slow-down in the delay of gates that are downstream to the sub-circuit. In other words, conventional peep-hole or partition based optimization system can waste a lot of time on checking transformations that degrade the overall circuit design timing, and are therefore rejected when evaluated in the larger (full) design context.

Some embodiments described herein feature a peep-hole or partition based optimization system that uses the transition-induced penalty to substantially speed-up optimization. Specifically, in these embodiments, the transition-induced delay change/degradation of the downstream gates is modeled at the outputs of the partition so that transformations that are performed on the partition can produce results that are acceptable in the larger design context.

FIG. 4 illustrates how the transition-induced penalty can be used in a peep-hole or partition based optimization system in accordance with some embodiments described herein.

The portion of the circuit design shown in FIG. 4 includes gates 402-428. A peep-hole or partition can generally include any arbitrary portion of the circuit design. For example, suppose partition 436 is being optimized. The endpoints of partition 436 are the output terminals of gates 412, 420, and 416. In this case, the $t_{slope}$ values $ts_{428\text{-}1}$ for the upper input of gate 428, $ts_{428\text{-}2}$ for the lower input of gate 428, $ts_{426}$ for gate 426, and $ts_{424}$ for gate 424 can be computed. In embodiments where the $t_{slope}$ values are pre-computed and stored in the NLDM table, the $t_{slope}$ values can be looked up using the original transition values at the corresponding inputs. Next, these $t_{slope}$ values can be propagated to partition boundary gates 412, 420, and 416. Specifically, $t_{slope}$ value $ts_{428\text{-}1}$ is propagated to gate 412, $t_{slope}$ values $ts_{428\text{-}2}$ or $ts_{426}$ are propagated to gate 420 according to the propagation rule that is being used (e.g., Equation (3) or (4)), and $t_{slope}$ value $ts_{424}$ is propagated to gate 416. The $t_{slope}$ propagation can continue in this fashion until all gates in partition 436 have a $t_{slope}$ value. Next, when partition 436 is optimized, the propagated $t_{slope}$ values are taken into consideration to prevent the optimization system from selecting transformations in partition 436 that are likely to cause delay violations (degradations) in gates that are downstream to partition 436.

FIG. 5 illustrates a process for determining a transition-effect model for a timing arc of a library cell in accordance with some embodiments described herein.

The process begins with receiving a discretized delay model for the timing arc of the library cell, wherein the discretized delay model is capable of being represented by a set of points in a multi-dimensional space, the multi-dimensional space including an output loading dimension, an input transition dimension, an output delay dimension, and an output transition dimension (operation 502). For example, the discretized delay model can be an NLDM that is structured as a table. Note that multiple discretized models may exist for a timing arc for different pairs of input/output transitions, e.g., a rise-rise NLDM, a rise-fall NLDM, a fall-rise NLDM, and a fall-fall NLDM. When multiple NLDMs exist for a given timing arc, multiple transition-effect models can be determined for the timing arc, i.e., one transition-effect model for each NLDM. In other embodiments, a single transition-effect model may be determined for multiple NLDMs. In these embodiments, the transition-effect model can be based on a statistic (e.g., an average, a median, etc.) of the multiple NLDMs.

Next, the process determines a set of transition-effect coefficients for the timing arc of the library cell based on the discretized delay model, wherein each transition-effect coefficient represents a linear relationship between a change in output delay and a change in input transition for a corresponding output load value from a set of output load values (operation 504).

In some embodiments, each transition-effect coefficient corresponds to a slope in a plot of output delay versus input transition. FIG. 1C illustrates a plot of output delay versus input transition for different output load values. The slope of the curves at each of the discrete points on the curves shown in FIG. 1C (e.g., at each of the input transition and output load values of the NLDM that was used for plotting the curve shown in FIG. 1C) can be used as the transition-effect coefficient. In other embodiments, each transition-effect coefficient corresponds to a slope in a plot of input transition versus output delay. In these embodiments, the transition-effect coefficient will be equal to the inverse of the $t_{slope}$ value that was computed using the equations shown above.

Once the set of transition-effect coefficients are computed for one or more library cells (typically the set of transition-effect coefficients will be computed for all timing arcs of all library cells that are used during optimization), they can be used during circuit optimization (operation 506).

Specifically, as explained in reference to FIGS. 2-3, a transition-effect coefficient can be propagated backward from downstream gates (e.g., U3-U5 in FIG. 2) to an output of a driver gate (e.g., U0 in FIG. 2). Next, the transition-effect coefficient can be used to compute a transition-induced penalty for each candidate library cell that is considered for optimizing the driver gate during a discretization operation in numerical synthesis (e.g., during operation 318 in FIG. 3).

Alternatively, as explained in reference to FIG. 4, transition-effect coefficients can be propagated backward from downstream gates (e.g., gates 424-428 in FIG. 4) through a partition (e.g., partition 436) of a circuit design. Next, one or more transition-effect coefficients can be used to compute one or more transition-induced penalties for evaluating each transformation that is considered for optimizing the partition during a partition-based delay or area optimization process.

During the backward propagation of transition-effect coefficients, exactly which transition-effect coefficient is propagated back depends on the definition of "worst-case" (e.g., whether we are using Equations (3) or (4) to determine the worst-case slope), and on how the transition-effect coefficients are computed (e.g., if the transition-effect coefficients correspond to the inverse of $t_{slope}$ values, then the minimum $t_{slope}$ value corresponds to the "worst-case").

Figure 6:
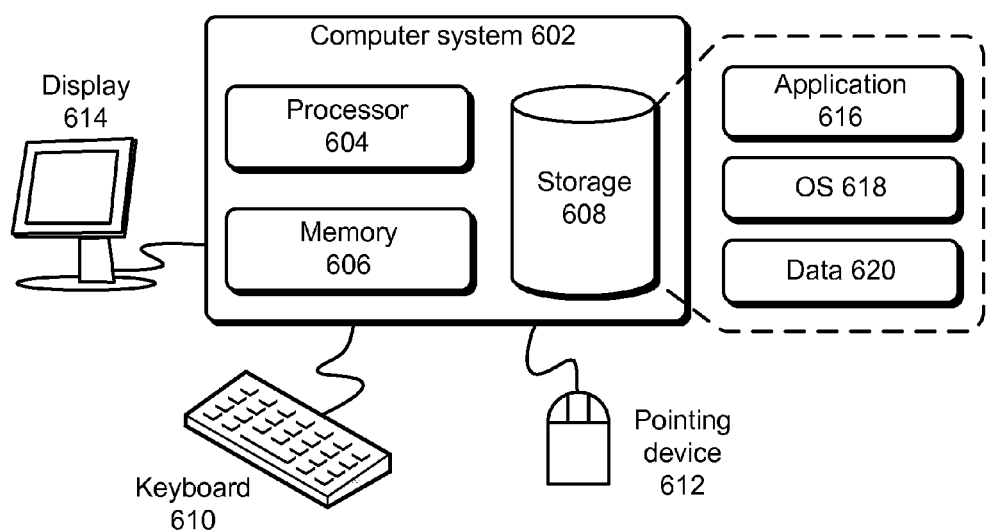
FIG. 6 illustrates a computer system in accordance with an embodiment of the present invention.

FIG. 6 illustrates a computer system in accordance with an embodiment of the present invention.

A computer system can generally be any system that can perform computations. Specifically, a computer system can be a microprocessor, an application specific integrated circuit, a distributed computing system, a cloud computing system, or any other computing system now known or later developed. Computer system 602 comprises processor 604, memory 606, and storage 608. Computer system 602 can be coupled with display 614, keyboard 610, and pointing device 612. Storage 608 can generally be any device that can store data. Specifically, a storage device can be a magnetic, an optical, or a magneto-optical storage device, or it can be based on flash memory and/or battery-backed up memory. Storage 608 can store application 616, operating system 618, and data 620.

Application 616 can include instructions that when executed by computer 602 cause computer 602 to perform one or more processes that are implicitly or explicitly described in this disclosure. Data 620 can include any data that is inputted into or outputted by application 616.

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining a transition-effect delay model for a timing arc of a library cell, the method comprising:

receiving a discretized delay model for the timing arc of the library cell, wherein the discretized delay model is capable of being represented by a set of points in a multi-dimensional space, the multi-dimensional space including an output loading dimension, an input transition dimension, an output delay dimension, and an output transition dimension; and determining, by computer, a set of transition-effect coefficients for the timing arc of the library cell based on the discretized delay model, wherein each transition-effect coefficient represents a linear relationship between a change in output delay and a change in input transition for a corresponding output load value from a set of output load values, wherein the set of transition-effect coefficients are used to compute transition-induced penalties, and wherein a transition-induced penalty is a delay penalty that estimates an impact that a change in a transition has on delays of downstream gates.

2. The method of claim 1, wherein each transition-effect coefficient corresponds to a slope in a plot of output delay versus input transition.

3. The method of claim 2, wherein the slope is computed at a nominal input transition value or at a nominal output delay value.

4. The method of claim 1, wherein a transition-effect coefficient is determined for each pair of input transition and output load values in the discretized delay model.

5. The method of claim 1, wherein a transition-effect coefficient is propagated backward from downstream gates to an output of a driver gate, and wherein the transition-effect coefficient is used to compute a transition-induced penalty for each candidate library cell that is considered for optimizing the driver gate during a discretization operation in numerical synthesis.

6. The method of claim 1, wherein transition-effect coefficients are propagated backward from downstream gates to gates in a partition of a circuit design, and wherein one or more transition-effect coefficients are used to compute one or more transition-induced penalties for evaluating each transformation that is considered for optimizing the partition during a partition-based delay or area optimization process.

7. A non-transitory computer-readable storage medium storing instructions that, when executed by a computer, cause the computer to perform a method for determining a transition-effect delay model for a timing arc of a library cell, the method comprising:
    receiving a discretized delay model for the timing arc of the library cell, wherein the discretized delay model is capable of being represented by a set of points in a multi-dimensional space, the multi-dimensional space including an output loading dimension, an input transition dimension, an output delay dimension, and an output transition dimension; and
    determining a set of transition-effect coefficients for the timing arc of the library cell based on the discretized delay model, wherein each transition-effect coefficient represents a linear relationship between a change in output delay and a change in input transition for a corresponding output load value from a set of output load values, wherein the set of transition-effect coefficients are used to compute transition-induced penalties, and wherein a transition-induced penalty is a delay penalty that estimates an impact that a change in a transition has on delays of downstream gates.

8. The non-transitory computer-readable storage medium of claim 7, wherein each transition-effect coefficient corresponds to a slope in a plot of output delay versus input transition.

9. The non-transitory computer-readable storage medium of claim 8, wherein the slope is computed at a nominal input transition value or at a nominal output delay value.

10. The non-transitory computer-readable storage medium of claim 7, wherein a transition-effect coefficient is determined for each pair of input transition and output load values in the discretized delay model.

11. The non-transitory computer-readable storage medium of claim 7, wherein a transition-effect coefficient is propagated backward from downstream gates to an output of a driver gate, and wherein the transition-effect coefficient is used to compute a transition-induced penalty for each candidate library cell that is considered for optimizing the driver gate during a discretization operation in numerical synthesis.

12. The non-transitory computer-readable storage medium of claim 7, wherein transition-effect coefficients are propagated backward from downstream gates to gates in a partition of a circuit design, and wherein one or more transition-effect coefficients are used to compute one or more transition-induced penalties for evaluating each transformation that is considered for optimizing the partition during a partition-based delay or area optimization process.

13. A computer system, comprising:
    a processor; and
    a non-transitory computer-readable storage medium storing instructions that, when executed by the processor, cause the computer system to perform a method for determining a transition-effect delay model for a timing arc of a library cell, the method comprising:
        receiving a discretized delay model for the timing arc of the library cell, wherein the discretized delay model is capable of being represented by a set of points in a multi-dimensional space, the multi-dimensional space including an output loading dimension, an input transition dimension, an output delay dimension, and an output transition dimension; and
        determining a set of transition-effect coefficients for the timing arc of the library cell based on the discretized delay model, wherein each transition-effect coefficient represents a linear relationship between a change in output delay and a change in input transition for a corresponding output load value from a set of output load values, wherein the set of transition-effect coefficients are used to compute transition-induced penalties, and wherein a transition-induced penalty is a delay penalty that estimates an impact that a change in a transition has on delays of downstream gates.

14. The computer system of claim 13, wherein each transition-effect coefficient corresponds to a slope in a plot of output delay versus input transition.

15. The computer system of claim 14, wherein the slope is computed at a nominal input transition value or at a nominal output delay value.

16. The computer system of claim 13, wherein a transition-effect coefficient is determined for each pair of input transition and output load values in the discretized delay model.

17. The computer system of claim 13, wherein a transition-effect coefficient is propagated backward from downstream gates to an output of a driver gate, and wherein the transition-effect coefficient is used to compute a transition-induced penalty for each candidate library cell that is considered for optimizing the driver gate during a discretization operation in numerical synthesis.

18. The computer system of claim 13, wherein transition-effect coefficients are propagated backward from downstream gates to gates in a partition of a circuit design, and wherein one or more transition-effect coefficients are used to compute one or more transition-induced penalties for evaluating each transformation that is considered for optimizing the partition during a partition-based delay or area optimization process.

* * * * *